United States Patent [19]

Patel et al.

[11] Patent Number: 5,414,540
[45] Date of Patent: May 9, 1995

[54] FREQUENCY-SELECTIVE OPTICAL SWITCH EMPLOYING A FREQUENCY DISPERSIVE ELEMENT, POLARIZATION DISPERSIVE ELEMENT AND POLARIZATION MODULATING ELEMENTS

[75] Inventors: Jayantilal S. Patel, Red Bank; Yaron Silberberg, West Windsor Township, Mercer County, both of N.J.

[73] Assignee: Bell Communications Research, Inc., Livingston, N.J.

[21] Appl. No.: 125,607

[22] Filed: Sep. 22, 1993

Related U.S. Application Data

[63] Continuation-in-part of Ser. No. 70,591, Jun. 1, 1993.

[51] Int. Cl.⁶ .................. G02F 1/137; G02F 1/13; H04J 14/06; H04J 14/02
[52] U.S. Cl. ................ 359/39; 354/94; 354/122; 354/128; 354/124; 385/37; 385/20; 385/17; 359/93; 359/245; 359/246
[58] Field of Search .......... 359/94, 39, 122, 128, 359/124, 130, 245, 246, 494, 496, 615, 123, 139, 131, 127, 97; 385/17, 37, 20

[56] References Cited

U.S. PATENT DOCUMENTS

| | | | |
|---|---|---|---|
| 3,506,834 | 4/1970 | Bushsbaum et al. | 359/138 |
| 3,536,375 | 10/1970 | Mansell | 359/246 |
| 4,655,474 | 4/1989 | Heritage et al. | 350/162.12 |
| 5,002,349 | 3/1991 | Cheung et al. | 350/96.13 |
| 5,005,166 | 4/1991 | Suzuki et al. | 359/123 |
| 5,111,321 | 5/1992 | Patel | 359/92 |
| 5,132,824 | 7/1992 | Patel et al. | 359/78 |
| 5,150,236 | 9/1992 | Patel | 359/71 |
| 5,319,484 | 6/1994 | Jacob et al. | 359/123 |

FOREIGN PATENT DOCUMENTS 62-305152 12/1987 Japan .................. 359/122

OTHER PUBLICATIONS

I. Nishi et al., "Broad-passband-width optical filter for multi/demultiplexer using a diffraction grating and a retroreflector prism," *Electronics Letters,* 1985, vol. 21, pp. 423–424.

M. Shirasaki et al., "Broadening of bandwidths in grating multiplexer by original dispersion-dividing prism," *Electronics Letters,* 1986, vol. 22, pp. 764–765.

Shirosaki et al., "Bistable magnetooptic switch for mutwork optical fiber", Applied Optics vol. 21, #11, Jun. 1, 1982, pp. 1943–1949.

*Primary Examiner*—William L. Sikes
*Assistant Examiner*—Kenneth Parker
*Attorney, Agent, or Firm*—Leonard Charles Suchyta; James W. Falk

[57] ABSTRACT

A liquid-crystal optical switch capable of switching separate optical signals in a physical input channel to a selected output channel. A diffraction grating spatially divides the input channel into its frequency components, which pass through different segments of a liquid-crystal modulator. The liquid-crystal modulator segments are separately controlled to rotate the polarization of the frequency channel passing therethrough or to leave it intact. The channels then pass through a polarization-dispersive element, such as calcite, which spatially separates the beams in the transverse direction according to their polarization. A second diffraction grating recombines the frequency components of the same polarization into multiple output beams.

16 Claims, 9 Drawing Sheets

FREQUENCY-SELECTIVE OPTICAL SWITCH EMPLOYING A FREQUENCY DISPERSIVE ELEMENT, POLARIZATION DISPERSIVE ELEMENT AND POLARIZATION MODULATING ELEMENTS

RELATED APPLICATIONS

This application is a continuation-in-part of Ser. No. 08/070,591, filed Jun. 1, 1993.

FIELD OF THE INVENTION

The invention relates generally to liquid-crystal devices. In particular, the invention relates to liquid-crystal and similar devices useful for switching in a multi-frequency communication system.

BACKGROUND ART

Communication networks increasingly rely upon optical fiber for high-speed, low-cost transmission. Optical fibers were originally envisioned as an optical replacement for electronic transmission media, such as high-speed coaxial cable and lower-speed twisted-pair cable. However, even high-speed optical fibers are limited by the electronics at the transmitting and receiving ends, generally rated at a few gigabits per second, although 40 Gb/s systems have been prototyped. Such high-speed electronic systems are expensive and still do not fully exploit the inherent bandwidth of fiber-optic systems, measured in many terabits per second.

All-optical transmission systems offer many intrinsic advantages over systems that use electronics within any part of the principal transmission path. Wavelength-division multiplexing (WDM) electronically impresses different data signals upon different carrier frequencies, all of which are carried by a single optical fiber. The earliest WDM systems did not provide optical switching but only point-to-point WDM.

Recent research and development have suggested that an all-optical network can be constructed having switching nodes that can switch the separate WDM channels (carrier frequencies) in different directions without the necessity of converting the optical signals to electronic signals. If such optical switching can be accomplished with simple optical components, a sophisticated optical network can be constructed at relatively low cost with the high-speed electronics being confined to end terminals that require speeds of only the individual channels and not of the total throughput of the system.

However, such optical switching needs to effectively separate the switched channels. A cross-talk requirement of 20 dB is a minimum, 35 dB would be a reasonable design requirement, 40 dB would be better. Also, the switching bands should be relatively wide to accommodate significant frequency fluctuations in the optical transmitters, particularly due to frequency chirping in directly modulated laser sources. That is, the switch must have its frequency bands registered with the transmitter even when the transmitting frequency is varying somewhat. The combination of a wide switching band and low cross talk requires a flat-top switch spectrum. Furthermore, a somewhat minimal WDM switch has a size of $2^4 \times 2^4$, that is, two physical input fibers and two output fibers, each bearing four WDM channels freely switched from either input to either output.

Cheung et al. in U.S. Pat. No. 5,002,349 have suggested that an acousto-optical tunable filter (AOTF) be used in such a WDM network, either at the switching node or at the terminal end. However, AOTFs have many intrinsic problems, such as cross-talk between adjacent-frequency signal. To date, these problems have prevented ATOFs from being adopted into communication networks. The physical mechanisms of AOTFs seem to preclude a good flat-top response.

Patel, sometimes in conjunction with co-inventors, has suggested that liquid-crystal filters be used in such WDM communication networks; see, for example, U.S. Pat. Nos. 5,111,321 and 5,150,236. Indeed, Patel has suggested in U.S. Pat. No. 5,111,321 that a liquid-crystal system could be used as a drop-add circuit. However, such a system appears difficult to implement.

Weiner and collaborators have disclosed how an optical signal can have its frequency-divided components separately phase-modulated or amplitude-modulated by using a diffraction grating to divide the input signal into spatially separated frequency components which are separately operated upon by a segmented modulator. See, for example, U.S. Pat. No. 4,685,547 to Heritage et al. Patel et al. have applied this concept to a system incorporating liquid-crystal modulators, as disclosed in U.S. Pat. No. 5,132,824.

The use of diffraction gratings for multiplexing in a WDM system has been described by Nishi et al. in "Broad-passband-width optical filter for multi/demultiplexer using a diffraction grating and a retroreflector prism," *Electronics Letters*, vol. 21, 1985, pp. 423–424 and by Shirasaki et al. in "Broadening of bandwidths in grating multiplexer by original dispersion-dividing prism," *Electronics Letters*, vol. 22, 1986, pp. 764–765.

Nonetheless, the prior art fails to disclose an effective, economical optical switch for a WDM telecommunication system.

SUMMARY OF THE INVENTION

The invention may be summarized as an optical switch, preferably using a segmented liquid-crystal modulator. The switch divides an input signal into multiple outputs according to the frequency components of the input signal. In particular, the input signal is spatially divided into its frequency components, which pass through different segments of a liquid-crystal polarization modulator. The different frequency components, depending upon their polarization impressed by the polarization modulator, are separated by a polarization divider. The frequency-divided components are then separately recombined according to their polarization, thereby producing two or more output signals that have been selectively separated according to optical frequency.

DETAILED DESCRIPTION OF THE PREFERRED EMBODIMENTS

The invention achieves all-optical switching of the frequency-multiplexed multi-channel optical signals by frequency-dividing an optical input signal into spatially separated channels, selectively changing the polarization characteristics of the frequency-separated channels, further spatially dividing the channels according to polarization characteristics, and then recombining the channels of similar polarization characteristics. Preferably, a segmented liquid-crystal modulator selectively changes the polarization of the physically separated channels.

Figure 1:
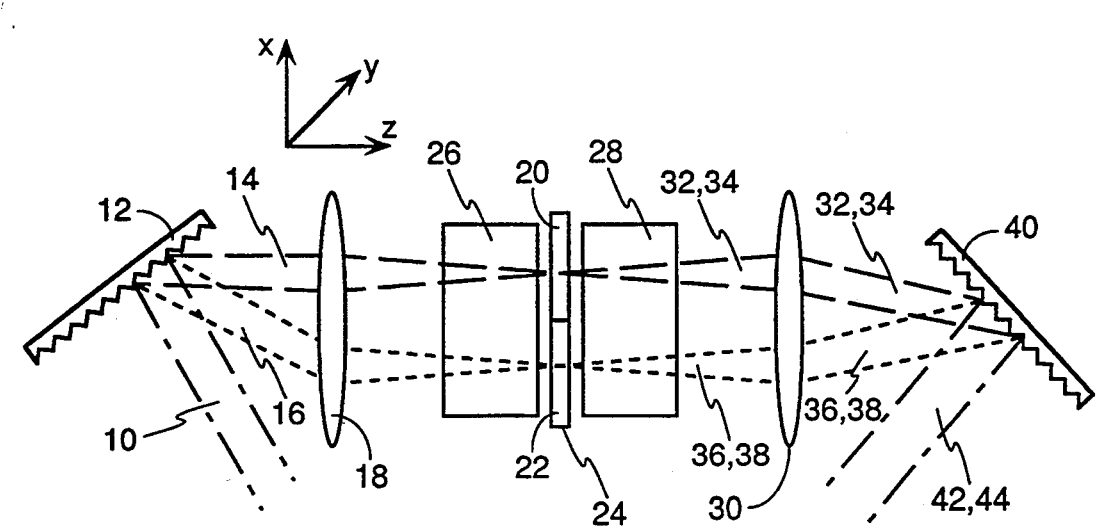
FIGS. 1, 2, and 3 illustrate respective horizontal, vertical, and isometric views of a polarization-sensitive 1×2 switch of the invention.

A first, polarization-sensitive embodiment is shown in cross-section in FIG. 1 in which a relatively broad-band input beam 10 strikes an entrance frequency-dispersive medium, such as a diffraction grating 12. It is assumed that the input beam 10 is polarized along the x-direction. Other active or passive dispersive media are possible, such as prisms. The frequency-dispersive medium 12 divides the broad-band input beam 10 into multiple frequency-separated input beams 14 and 16 which are spatially separated in the illustrated x-direction. An entrance lens 18 focuses the frequency-divided components upon separate segments 20 and 22 of a segmented liquid-crystal polarization modulator 24. An entrance polarization-dispersive element 26, such as a birefringent crystal, such as calcite, is disposed on the entrance side to spatially separate the different polarization components of the input beam, but its effects are not evident for the first embodiment from FIG. 1 because the input beam 10 is assumed to be linearly polarized along the x-axis.

The number of frequency-divided input beams 14 and 16 and the number of liquid-crystal segments 20 and 22 depend on the number of WDM components on the optical medium (optical fiber) which require switching. Four frequency sub-bands provide a meaningful telecommunication system. The segments 20 and 22 of the segmented liquid-crystal modulator 24 are separately controllable to change the polarization direction or other polarization characteristic of the physically separated frequency-divided input beams 14 and 16. In the simplest case, each segment 20 or 22 either linearly rotates the polarization of the properly polarized frequency-separated input beam 14 or 16 by 90° or does not rotate the polarization. A twisted nematic liquid-crystal modulator provides such performance.

Figure 2:
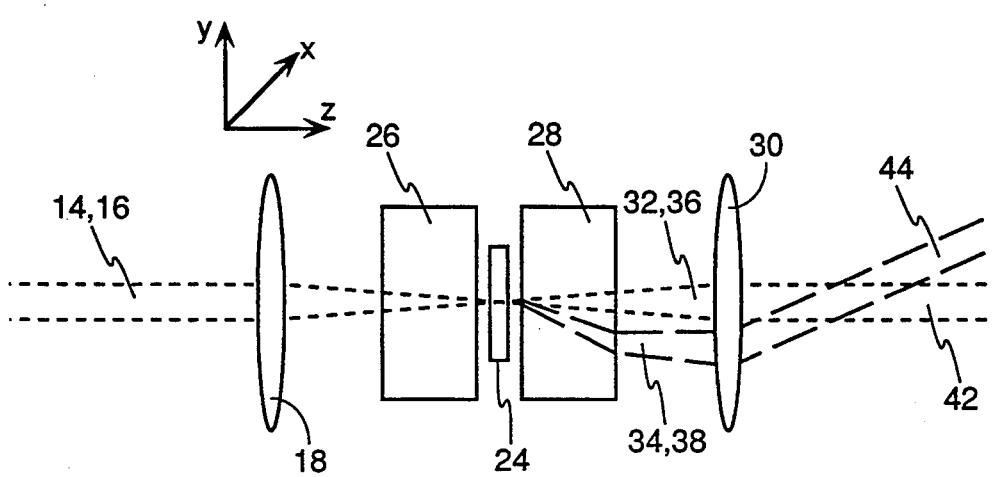

After traversing the liquid-crystal modulator 24, the frequency-separated beams 14 and 16 traverse the exit polarization-dispersive element 28, which, as additionally illustrated in FIG. 2, further separates the beams 14 and 16 into their respective polarization components 32, 34 and 36, 38. An exit lens 30 recollimates the beams. An exit frequency-dispersive medium 40, such as another grating, acts reciprocally to the entrance frequency-dispersive medium 123 and recombines frequency- and polarization-separated beams into only polarization-separated beams 42, 44, which, as will be shown later, are spatially separated as well.

Turning more completely now to the perpendicular illustration of FIG. 2, the two frequency beams 14 and 16 are congruent along the x-direction. It is assumed that the two input beams 14 and 16 are polarized along the x-direction and thus not affected by the entrance polarization-dispersive element 26. This assumption manifests that the system of FIGS. 1 and 2 is polarization sensitive. As a result, the entrance polarization-dispersive element 26 is not required for this polarization-sensitive, single-input embodiment. Referring simultaneously to FIGS. 1 and 2 and to an isometric view, illustrated in FIG. 3, of the central portion of these figures, when the first segment 20 of the segmented liquid-crystal modulator 24 is not actively biased, it rotates by 90° the polarization of the incident beam 14 of the first frequency such that, when it traverses the output polarization-dispersive element 28, it is displaced downwardly along the y-axis into displaced output beam 34 of the first frequency. On the other hand, when the first segment 20 is actively biased, it does not rotate the polarization of the entrance beam 14 of the first frequency. As a result, it traverses the output polarization-dispersive element 28 without spatial displacement into undisplaced output beam 32 of the first frequency. Similarly, active biasing of the second segment 22 rotates by 90° the polarization of the entrance beam 16 of the second frequency, and thus the output polarization-dispersive element 28 converts it into displaced output beam 38 of the second frequency; while inactive biasing leaves its polarization unaffected, and thus the dispersive element 28 converts it into undisplaced output beam 36 of the second frequency. The output frequency-dispersive element 40 then recombines the undisplaced output beams 32 and 36 of both frequencies into a combined undisplaced output beam 42 and the displaced output beams 34 and 38 of both frequencies into a combined displaced output beam 44.

Therefore, the biasing of both of the segments 20 and 22 of the liquid-crystal modulator 24 determines into which output beam 42 and 44 either or both of the entrance beams 14 and 16 are directed. That is, a polarization-sensitive 1×2 switch has been described.

Figure 4:
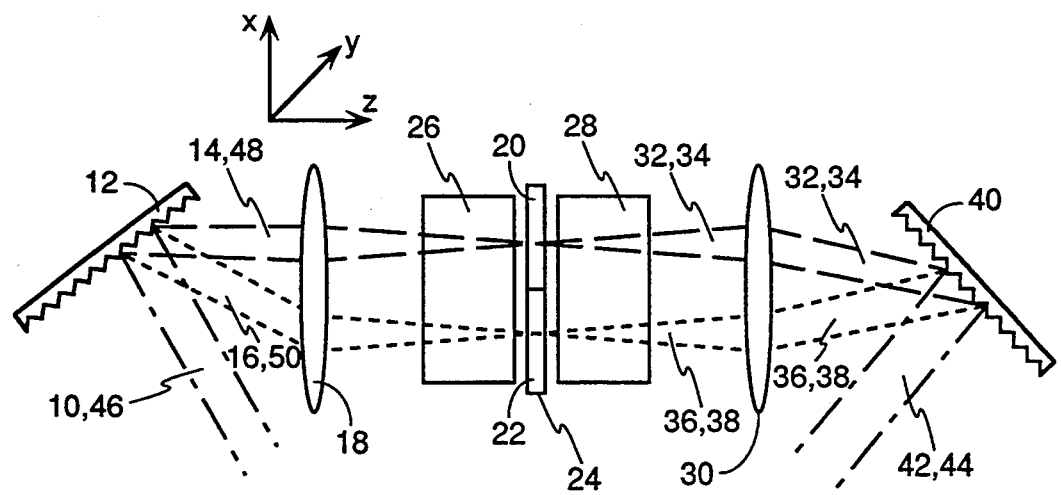
FIGS. 4, 5, and 6 illustrate respective horizontal, vertical, and isometric views of a polarization-sensitive 2×2 switch of the invention.
Figure 5:
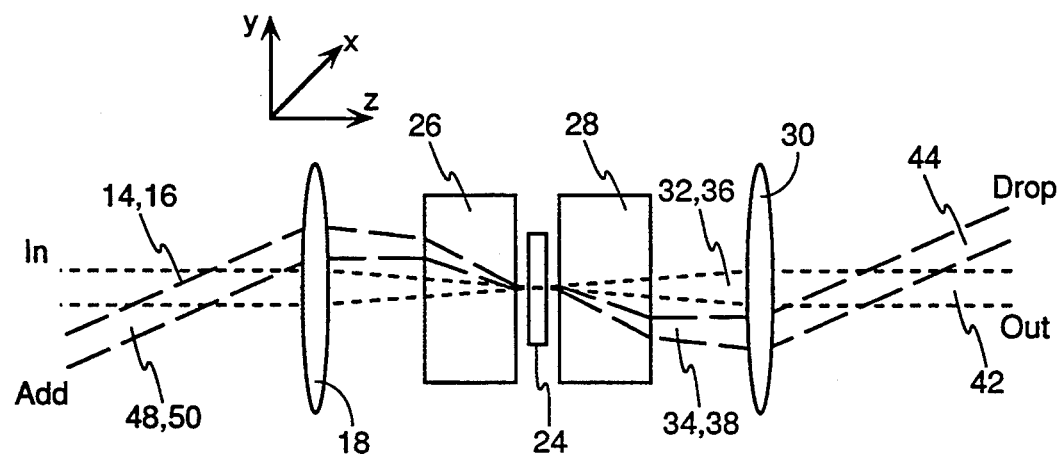
Figure 6:
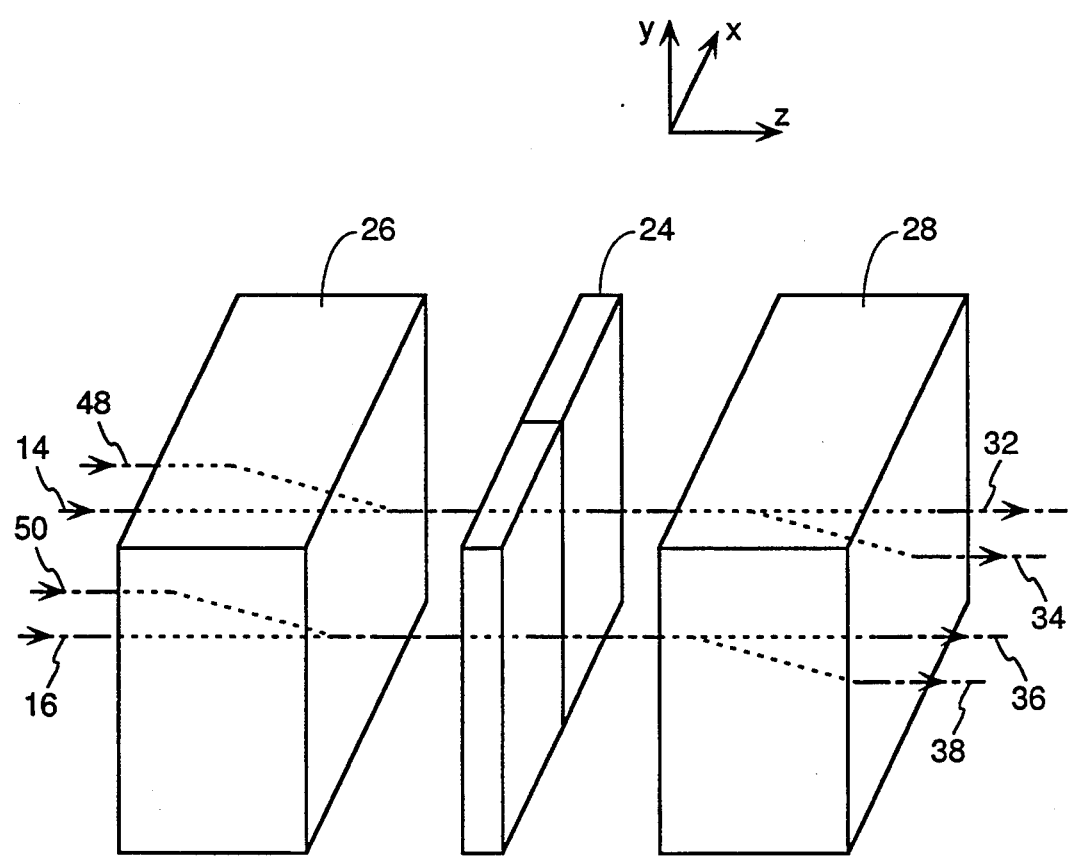

Referring now to FIGS. 4, 5, and 6, a second input fiber outputs a second entrance beam 46, which strikes the entrance frequency-dispersive element 12 at a vertically oblique angle so as to produce from the second input fiber multiple angularly separated, frequency-separated beams 48 and 50. The second entrance beam is assumed to be polarized along the y-axis so that the entrance polarization-dispersive element 26 deflects it along the y-axis. The angular resolution of the input frequency-dispersive element 12 and birefringent length of the first polarization-dispersive element 26 are such that the components of the same frequency from the two input beams 10 and 46 are focused upon the same segment 20 or 22 of the segmented liquid-crystal modulator 24. As a result, the respective segmented polarization rotator of the liquid-crystal modulator 24 either rotates both the WDM components of the same frequency by the same polarization angle or does not. Preferably, the liquid-crystal modulator 24 rotates the polarization by 90° or does not rotate it. That is, either the linear polarization directions of either beam pair 14, 48 or 16, 50 are reversed or left intact (within an angular factor of 180°).

The second polarization-dispersive element 28 is oriented so as to act conversely to the first polarization-dispersive element 26. The beams 32 and 36 polarized along the x-axis remain undetected, while the beams 34 and 38 polarized along the y-axis are deflected by the second polarization-dispersive element 28 back toward normal propagation path. The exit lens 30, however, angularly separates the resultant output beam 44 from the output beam 42.

In the parlance of a drop-add circuit, the input beam 10 is the IN channel, the input beam 46 is the ADD channel, the output beam 42 is the OUT channel, and the output beam 44 is the DROP channel.

By the means of the illustrated circuitry, the frequency-dedicated segment 20 or 22 of the liquid-crystal modulator 24 determines whether a pair of channels of the same frequency on the two multi-frequency input fibers are to be switched to different output fibers. Of course, the two segments 20 and 22 can be separately controlled for the two frequency channels.

Although only two frequency channels have been described, it is understood that more frequency channels can be accommodated by a liquid-crystal modulator 20 having additional separately controlled segments along the x-direction.

The above embodiments are sensitive to polarization of their input signals. But, in many cases, the input light polarization cannot be controlled. Merely using an input polarizer is unsatisfactory because possibly all the light may be lost and because the polarization state tends to be randomly vary in time, therefore leading to polarization-caused intensity fluctuations. However, the invention can be made to be polarization insensitive.

Figure 11:
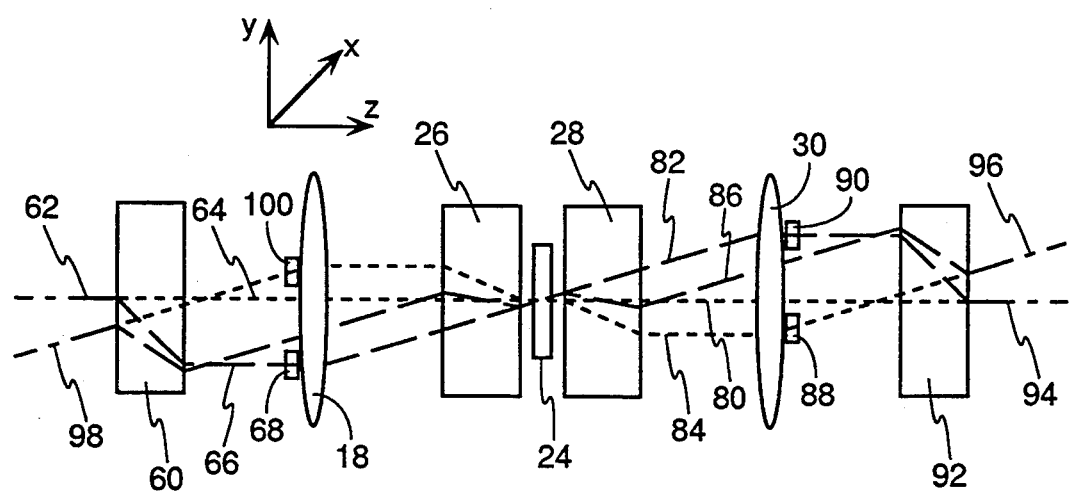
FIG. 11 is a vertical view of a polarization-insensitive embodiment of the invention.

As illustrated in FIG. 11, a first polarization-dispersive element 60, such as a calcite crystal, divides an input beam 62 into two polarization-separated beams 64 and 66, one the ordinary beam 64 and the other the extraordinary beam 66. One of the beams, in the illustrated case, the extraordinary beam 66, passes through a polarization converter 68, such as a half-wave plate which rotates the polarization by 90°, so that both beams 64 and 66 have the same well-defined polarization characteristic, here a linear polarization along the x-axis. The entrance lens 18 focuses both beams 64 and 66 upon the same segment 20 or 22 of the liquid-crystal modulator 24, which simultaneously acts on both beams 64 and 66, either leaving their polarization intact or rotating them or producing a combination between beams. The exit polarization-dispersive element 28 then spatially separates them according to polarization; if unrotated, into beams 80 and 82; if rotated, into beams 84 and 86. Two more polarization rotators 88 and 90 are disposed in two of the beams 82 and 84. The exit lens 30 recollimates the beams 80–86, and a second polarization-dispersive element 92 acts conversely to the first one 60 to recombine the beams 80 and 82 into a combined OUT beam 44 and to recombine the beams 84 and 86 into a combined DROP beam 96.

The frequency-dispersed beams are not illustrated but are arranged similarly to those of FIG. 4. The embodiment can be easily extended to a 2×2 drop-add circuit having an additional ADD input beam 98 by including a polarization rotator 100 for the added input on the entrance side.

The above embodiments have been described in somewhat theoretical terms. The following discussion involves some of the design considerations. Let f represent the focal lengths of the two lenses 18 and 30; $d_1$, the lateral shift of the inner polarization-dispersive elements 26 and 28; $d_2$, the lateral shift of the outer polarization-dispersive elements 60 and 92; and L the distance between the input polarization-dispersive element 60 and its associated lens 18. The switched (extraordinary beams) have a virtual focus shifted by $d_1$ from the ordinary focus. The extraordinary and ordinary beams therefore form an angle of $d_1/f$ with respect to the input and output ordinary beams. If f=100 mm and d=100 mm, the angle is 0.02 rad or about 1°. The main ordinary input beam is assumed to define x=0 for each frequency. The ordinary beam is then at $x=-d_2$. The ordinary and extraordinary beams of the ADD (or DROP) channel at the lens 18 or 30 are located at $x=d_1$ and $x=d_2-d_1$, respectively. At the external crystals, these beams are at $x=ld_1/f-d_1$ and $x=ld_1/f-d_1-s$.

For the beams to overlie at that point, it is required that L=f.

The preceding embodiments have used a calcite crystal or similar uniaxial medium for the polarization-dispersive element. Wollaston prisms offer an advantageous alternative design. Such prisms have two prisms of calcite, for example, separated by a thin layer of material having a refractive index intermediate between the refractive indices of the ordinary and extraordinary refractive indices of the calcite. The two component prisms are oriented such that one of the rays is totally internally reflected by the intermediate thin layer. The result is that the ordinary and extraordinary rays are angularly separated.

Figure 3:
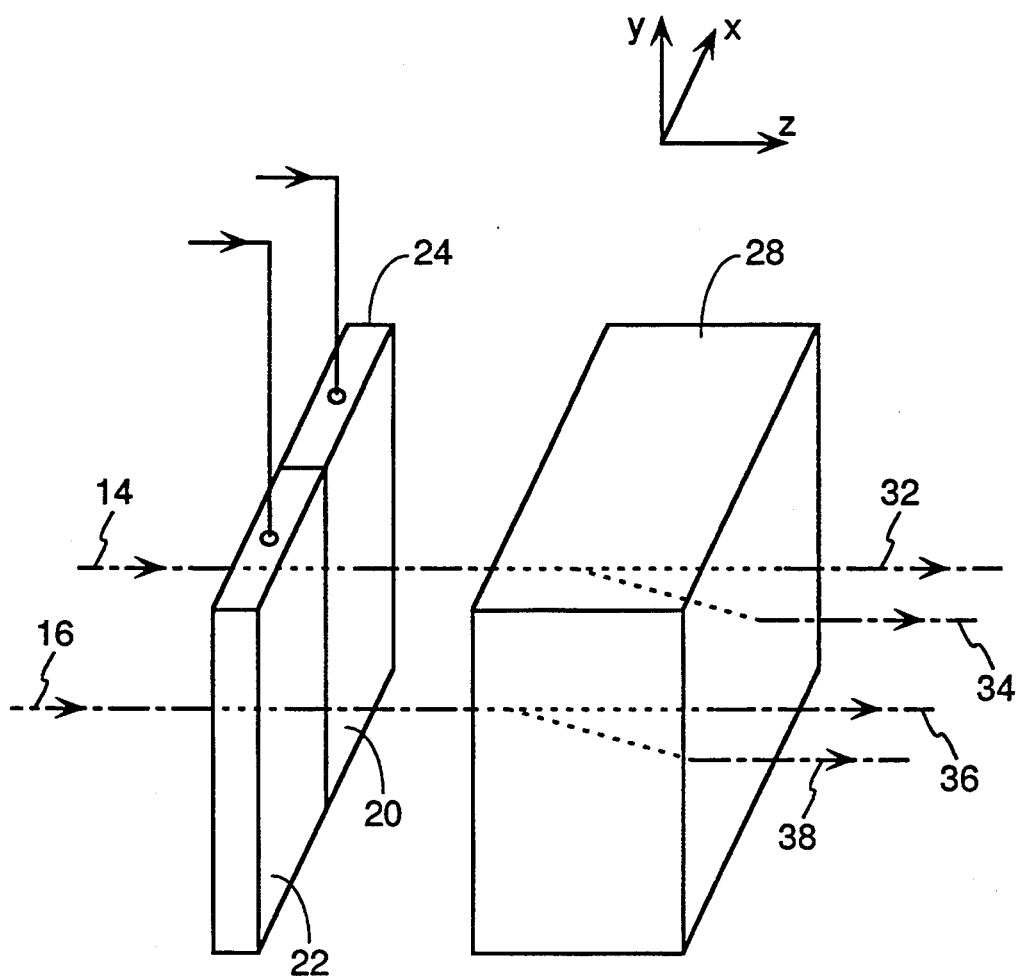
Figure 12:
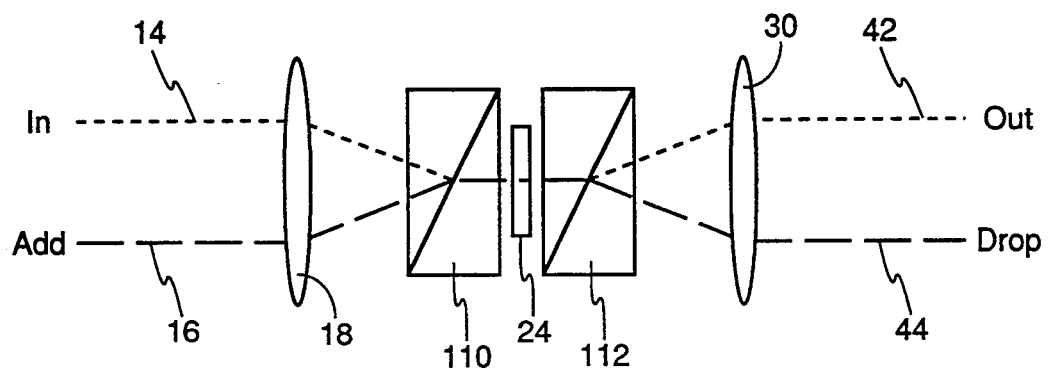
FIG. 12 is a vertical view of an alternative polarization-sensitive embodiment of the invention using Wollaston prisms.

A polarization-sensitive embodiment utilizing Wollaston prisms is illustrated in FIG. 12. The perpendicular construction is very similar to that of FIG. 4. The entrance and exit calcite crystals 26 and 28 of FIGS. 1, 2, and 3 are replaced by entrance and exit Wollaston prisms 110 and 112. Their birefringent thicknesses and the focal lengths of the two lenses 18 and 30 are arranged such that the two optical input beams 14 and 16, the IN and ADD beams, are focused to the interface of the entrance Wollaston prism 110 having such a length that both beams 14 and 16 (of differing polarizations) then are congruent as they pass the liquid-crystal modulator 24. Preferably, the input beams 14 and 16 can be made parallel. Similar design factors on the output side allow the two output beams 42 and 44, the OUT and DROP beams, to be parallel.

EXAMPLE 1

Figure 7:
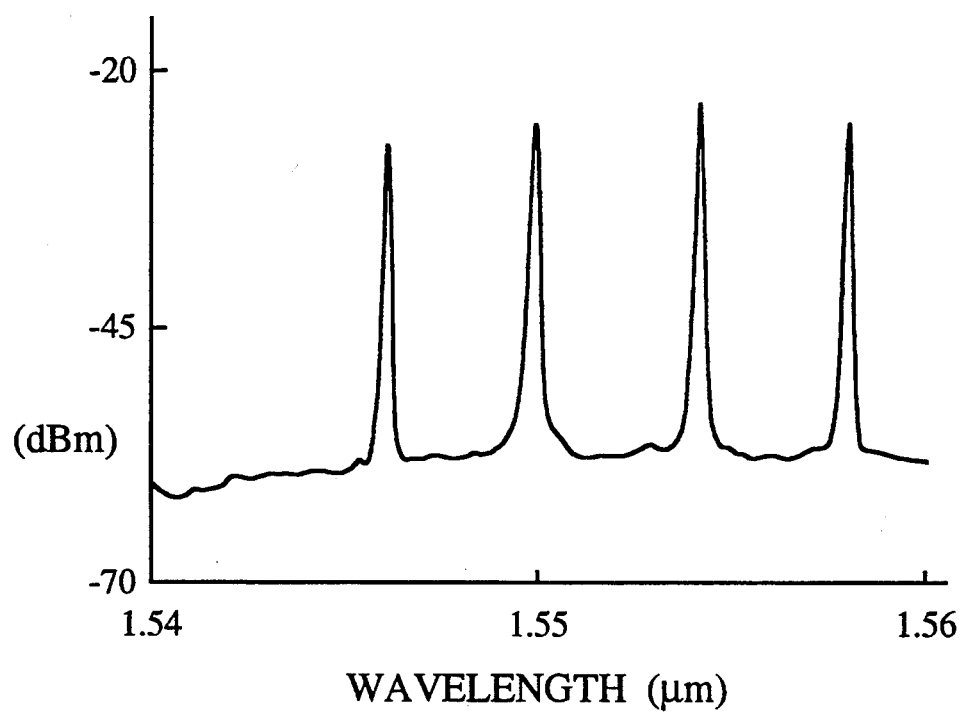
FIGS. 7, 8, 9, and 10 are graphs of experimental data of an embodiment of the invention.
Figure 8:
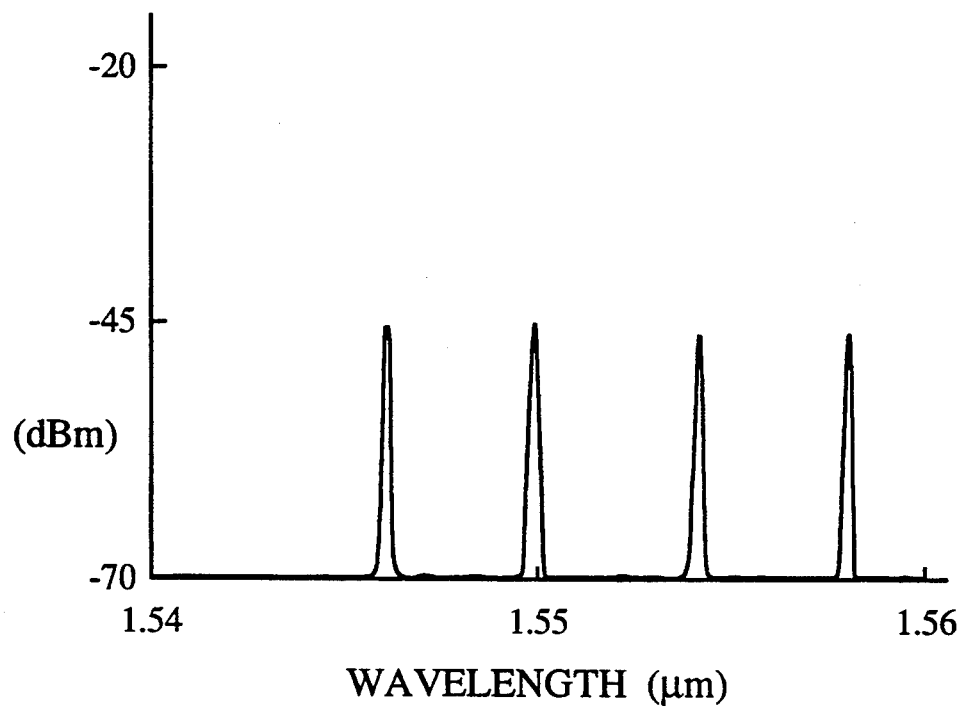
Figure 9:
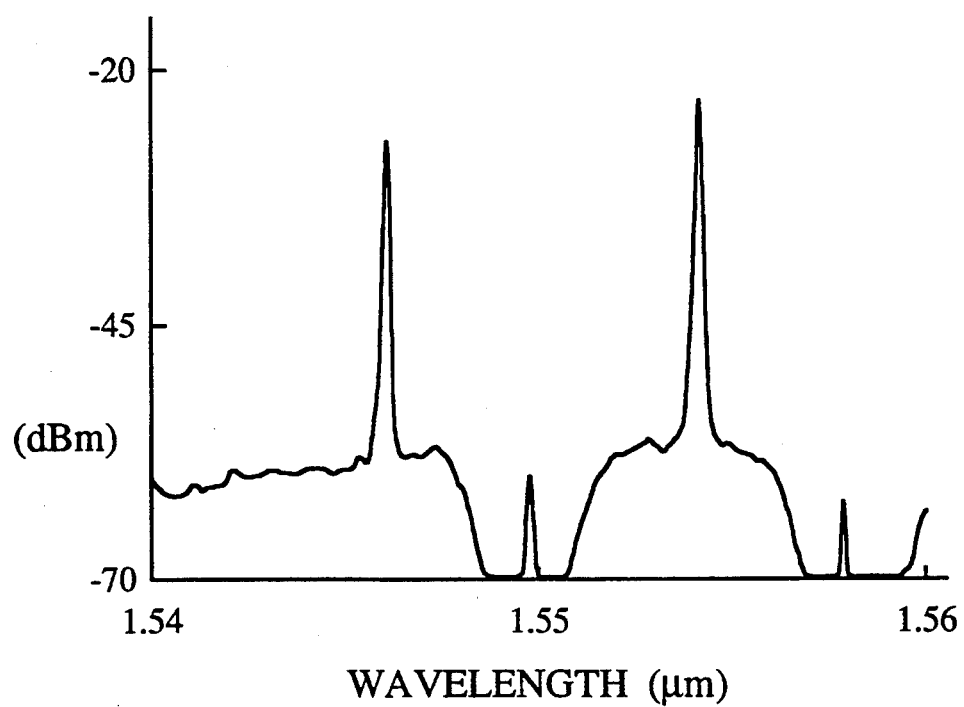
Figure 10:
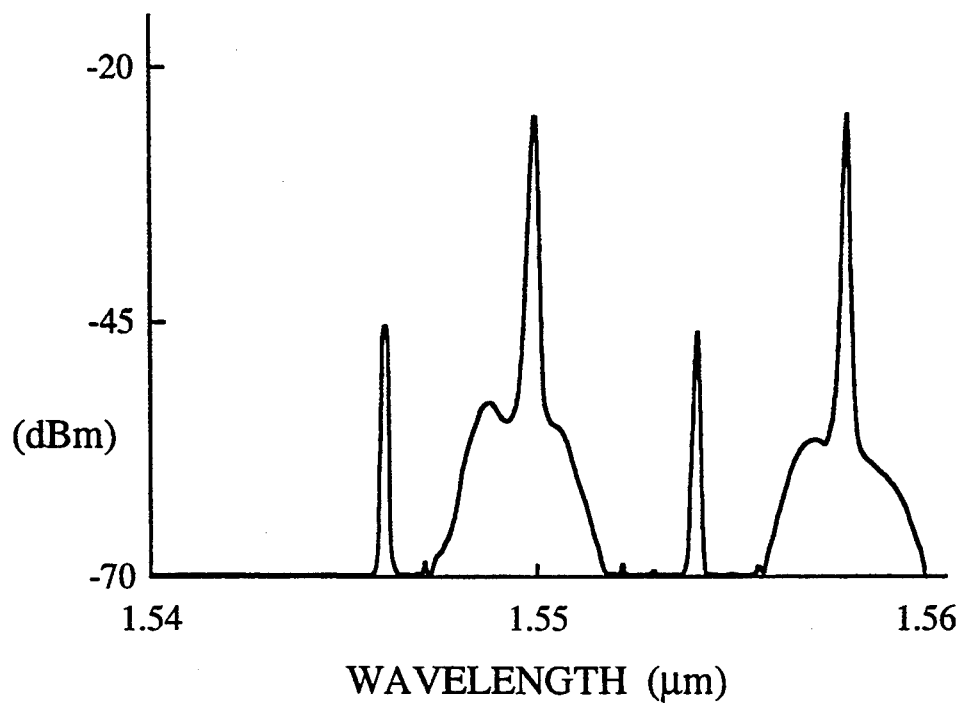

We have constructed and tested a switch according to the above embodiment. It was designed to switch one or more of six channels having 4 nm spacing between the channels and to have a wavelength resolution of 2 nm. The liquid-crystal modulator was filled with commercially available E7 nematic liquid crystal and was twisted by 90°. The polarization-dispersive element was a Wollaston prism. Many of the details of fabrication are found in the parent patent application and the various cited patents to Patel. The design of the switch was optimized for 1.5 μm. In an experimental prototype, we have shown an extinction ratio of at least 35 dB between the switched and unswitched states of the polarizers. In FIGS. 7 and 8 are shown the optical power spectra on the unswitched output channel and the switched output channel respectively when no switching is performed. That is, FIG. 8 shows the residual power in the four unswitched channels. The power levels indicated on the vertical scale are somewhat arbitrary and reflect an 8 dB system loss. In FIGS. 9 and 10 are shown the optical spectra of the unswitched and switched outputs respectively when the first and third channels are switched. It is thus seen that the inventive system effectively switches the WDM channels.

Figure 13:
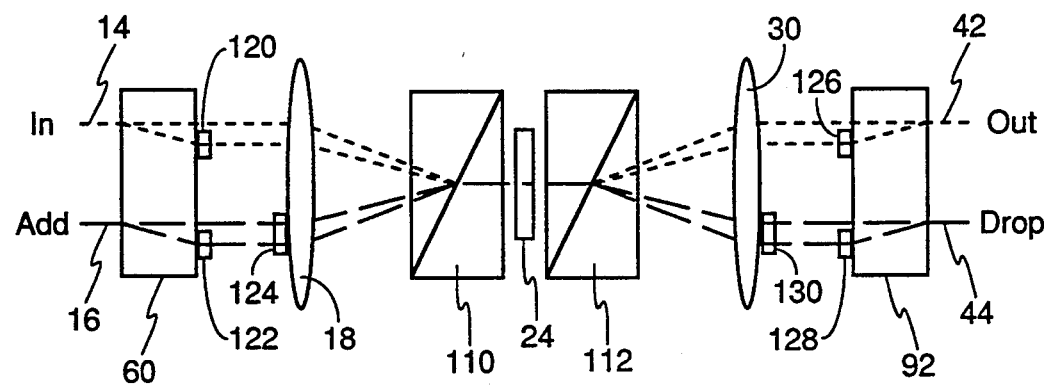
FIG. 13 is a vertical view of an extension of the embodiment of FIG. 11 that has been made polarization insensitive.

The embodiment of Wollaston prisms can be made insensitive to polarization, as illustrated in FIG. 13, by including the first and second polarization-dispersive elements 60 and 92, preferably calcite crystals or similar material, on the input and output ends. Half-wave plates 120, 122, and 124 are placed in the path of the laterally displaced beams and in the path of both of the input ADD beams. The wide half-wave plate 124 causes the IN and ADD beams to have differing polarizations as they congruently pass through a segment of the liquid-crystal modulator 24. Similarly, half-wave plates 126, 128, and 130 are placed in the to-be-displaced output beams and both of the DROP beams.

Figure 14:
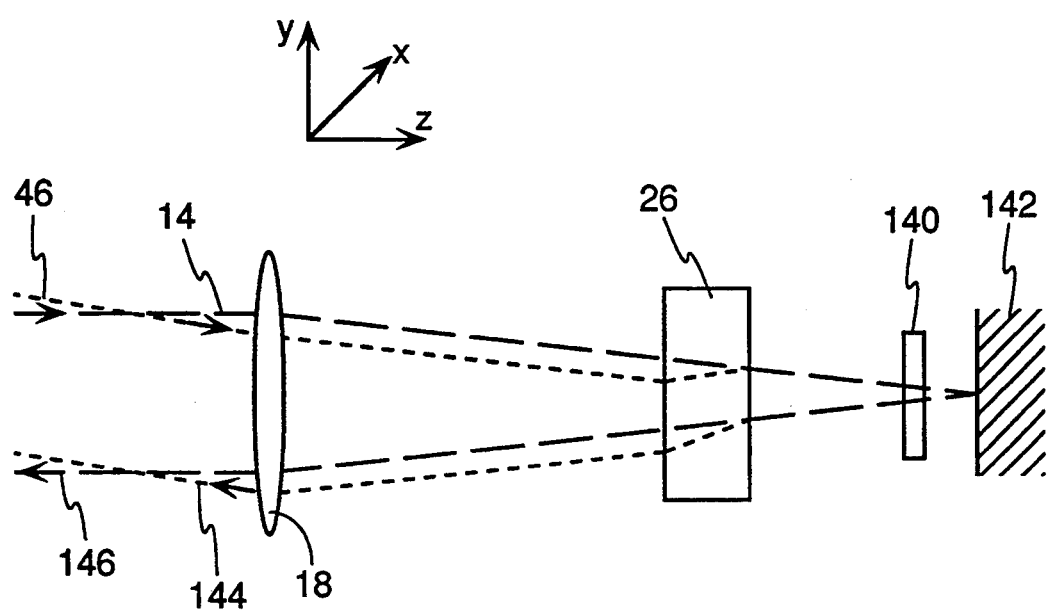
FIG. 14 is a vertical view of a reflective embodiment of the switch of the invention.

The number of pans can be significantly reduced by using a reflector and operating in the retro-reflector mode. As illustrated in FIG. 14, the input beam 14, after diffracting from the grating (not shown), strikes the lens 18 off-center and is refracted obliquely to the principal optical axis. Because it is polarized along the x-direction, it passes undetected through the polarization-dispersive element 26, which may be calcite or a Wollaston prism. It then passes through one segment of the segmented liquid-crystal polarization modulator system 140, which differs from the previously described liquid-crystal polarization modulators in that it selectively rotates the light polarization by 90° only after a double, back-and-forth pass. The light is then reflected from a mirror 142 and again traverses the polarization modulator 140. The polarization of light traversing actively biased segments of the modulator 140 is not rotated while that of light traversing inactively biased segments is rotated by a total of 90°. The light with rotated polarization is displaced by the polarization-dispersive element 26 and, after diffraction, is output as a first output beam 144 while the light with unrotated polarization is output as a second output beam 146. The two output beams 144 and 146 are angularly displaced so as to be easily separated physically.

The second input beam 46, assumed to be polarized along the y-direction strikes the lens 18 obliquely with respect to the first input beam 14 but in the same general off-axis location. Because of their assumed different polarizations, the polarization-dispersive element 26 affects them conversely, but the segmented polarization modulator 140 simultaneously rotates (or does not rotate) both of their polarization states. In the backward propagation, the diffraction grating recombines the optical frequency carriers into the desired ADD and DROP channels, as determined by the segmented polarization modulator 140.

The optical switch of FIG. 14 can be made frequency insensitive using techniques described for the other embodiments.

The frequency dispersion at the liquid-crystal modulator of the invention allows the modulator to simultaneously change the phase and/or amplitude of the different frequency components of the signals. Such adjustment is particularly advantageous to additionally compensate for the frequency dispersion of the optical fiber or to equalize amplitudes between different channels.

Although the described embodiments have placed the frequency-dispersive elements on the outside of the polarization-dispersive elements, it is recognized that the two dispersions can be performed in the opposite order and even simultaneously.

The invention can thus be used in a number of related configurations, all of which are useful for providing an economical, all-optical multi-frequency switch. When the polarization modulator is a segmented liquid-crystal modulator, the system is both easy to construct, and the modulator has transfer characteristics consistent with a relaxed system design.

What is claimed is:

1. An optical switch, comprising:
   a frequency-dispersive element receiving an input beam and dispersing it into a plurality of first beams according to frequency;
   a polarization-dispersive element receiving said first beams and outputting corresponding second beams;
   a segmented liquid-crystal polarization modulator receiving said second beams on respective segments thereof and selectively rotating polarizations thereof to form third beams; and
   a reflector reflecting said third beams back through said polarization modulator, said polarization-dispersive element, and said frequency-dispersive element.

2. An optical switch comprising
   an entrance frequency dispersive element for receiving first and second input optical signals and dispersing them into dispersed beams according to the frequencies thereof,
   a focusing lens receiving said dispersed optical beams,
   a segmented polarization modulator having multiple individually controlled segments and positioned essentially at the focal length of said focusing lens for selectively controlling polarization characteristics of individual elements of said dispersed optical beams,
   a first polarization-dispersive element positioned between said focusing lens and said segmented polarization modulator,
   a second polarization-dispersive element positioned to the other side of said segmented polarization modulator than said first polarization-dispersive element for receiving the dispersed outputs of said segmented polarization modulator and for spatially displacing individual elements of said dispersed outputs dependent on the polarization thereof,
   an exit lens for receiving the outputs of said second polarization dispersive element, said exit lens being essentially its focal distance away from said segmented polarization modulator, and
   an exit frequency dispersive element receiving the dispersed outputs from the second focusing lens and combining frequency components thereof into separate output optical signals.

3. An optical switch in accordance with claim 2 wherein said segmented polarization modulator is a liquid-crystal modulator.

4. An optical switch in accordance with claim 3 wherein said entrance and exit dispersive elements are gratings.

5. An optical switch in accordance with claim 2 wherein said first and second polarization-dispersive elements are birefringent crystals.

6. An optical switch in accordance with claim 2 wherein said first and second polarization-dispersive elements are Wollaston prisms, the focal length of said focusing lens being at the interface of said first polarization-dispersive Wollaston prism.

7. An optical switch in accordance with claim 6 further comprising a third polarization-dispersive element in front of said entrance frequency dispersive element and a fourth polarization-dispersive element behind said exit frequency dispersive element, the input to said third polarization-dispersive element being said first and second input signals and the output from said third polarization-dispersive element being a pair of beams for each of said first and second input signals, one beam of each pair being laterally displaced dependent on polarization, and a half-wave plate positioned in the path of only one of each pair of beams.

8. An optical switch in accordance with claim 7 wherein said third and fourth polarization-dispersive elements are birefringent crystals.

9. An optical switch in accordance with claim 7 wherein said half-wave plates are positioned in the path of each of said laterally displaced beams only.

10. An optical switch in accordance with claim 7 further comprising a further half-wave plate adjacent the side of said focusing lens receiving said dispersed optical beams but in the path of only one of said pair of beams.

11. An optical switch in accordance with claim 10 further comprising a half-wave plate adjacent the input side of said fourth polarization dispersive element in the path of each of said laterally displaced beams only.

12. An optical switch comprising in sequence
a frequency dispersive element for receiving an input optical signal and dispersing it into a dispersed optical beam according to the frequencies thereof,
a focusing lens receiving said dispersed optical beam,
a polarization-dispersive element,
a segmented polarization modulator having multiple individually controlled segments and positioned essentially at the local length of said focusing lens for selectively controlling the polarization characteristics of individual elements of said dispersed optical beam, and
means for recombining said dispersed optical beam after passage through said segmented polarization modulator into an output beam.

13. An optical switch in accordance with claim 12 wherein said means for recombining comprises reflector means for reflecting said dispersed optical beam back through said segmented polarization modulator, said polarization-dispersive element and said frequency dispersive element.

14. An optical switch in accordance with claim 12 wherein said means for recombining includes a second polarization-dispersive element for spatially displacing individual elements of said dispersed beam received from said segmented polarization modulator dependent on the polarization thereof, a second lens, and a second frequency dispersive element.

15. An optical switch in accordance with claim 12 wherein said frequency dispersive element is a grating and said segmented polarization modulator comprises a liquid-crystal modulator.

16. An optical switch in accordance with claim 12 further comprising a second polarization-dispersive element in front of said frequency dispersive element, said second polarization-dispersive element including half-wave plates positioned in the path of laterally displaced beams only from said second polarization-dispersive element.

* * * * *

UNITED STATES PATENT AND TRADEMARK OFFICE
CERTIFICATE OF CORRECTION

PATENT NO. : 5,414,540
DATED : May 9, 1995
INVENTOR(S) : Jayantilal S. PATEL et al.

It is certified that error appears in the above-indentified patent and that said Letters Patent is hereby corrected as shown below:

Column 8, line 63, change "arc" to --are--.

Column 10, line 1, change "local" to --focal--.

Signed and Sealed this

Twenty-ninth Day of June, 1999

*Attest:*

Q. TODD DICKINSON

*Attesting Officer*  *Acting Commissioner of Patents and Trademarks*